(12) United States Patent
Dappers et al.

(10) Patent No.: US 8,931,590 B2
(45) Date of Patent: Jan. 13, 2015

(54) EXHAUST SYSTEM COMPONENT FOR A MOTOR VEHICLE

(75) Inventors: Thilo Dappers, Saarbruecken (DE); Guengoer Bastan, Dreieich (DE)

(73) Assignee: GM Global Technology Operations LLC, Detroit, MI (US)

( * ) Notice: Subject to any disclaimer, the term of this patent is extended or adjusted under 35 U.S.C. 154(b) by 472 days.

(21) Appl. No.: 13/349,213

(22) Filed: Jan. 12, 2012

(65) Prior Publication Data

US 2012/0180303 A1 Jul. 19, 2012

(30) Foreign Application Priority Data

Jan. 14, 2011 (DE) .......................... 10 2011 008 594

(51) Int. Cl.
*F01N 1/18* (2006.01)
*F01N 13/18* (2010.01)
*B60K 13/04* (2006.01)

(52) U.S. Cl.
CPC ........ *F01N 13/1805* (2013.01); *F01N 13/1855* (2013.01); *B60K 13/04* (2013.01); *F01N 2590/04* (2013.01)
USPC ....................................... 181/241

(58) Field of Classification Search
CPC .......................... F01N 13/1805; F01N 13/1855
USPC .............................. 181/241, 282; 60/299, 302
See application file for complete search history.

(56) References Cited

U.S. PATENT DOCUMENTS

| 5,961,153 A * | 10/1999 | Foster ............................. 285/15 |
| 2003/0091455 A1 | 5/2003 | Mathew |
| 2007/0029132 A1 * | 2/2007 | Feight et al. .................. 181/239 |

FOREIGN PATENT DOCUMENTS

| DE | 102007013867 A1 | 9/2008 |
| DE | 102008011441 A1 | 9/2008 |
| FR | 2867252 A1 | 9/2005 |
| GB | 2383606 A | 7/2003 |

* cited by examiner

*Primary Examiner* — Jeremy Luks
(74) *Attorney, Agent, or Firm* — Ingrassia Fisher & Lorenz, P.C.

(57) ABSTRACT

An exhaust system component for a motor vehicle has a first exhaust passage, an attachment flange, which encloses the first exhaust passage, for the connection of the component to an adjacent component, the attachment flange defining an attachment plane for the contact with the adjacent component and having fastening holes for the connection to the adjacent component, and a second exhaust passage, which is spaced apart from the first exhaust passage in a longitudinal direction of the component. A normal line on the attachment plane extends at a non-negligible angle to the longitudinal direction, and the fastening holes are elongated in a direction parallel to the attachment plane.

5 Claims, 1 Drawing Sheet

EXHAUST SYSTEM COMPONENT FOR A MOTOR VEHICLE

CROSS-REFERENCE TO RELATED APPLICATION

This application claims priority to German Patent Application No. 102011008594.7, filed Jan. 14, 2011, which is incorporated herein by reference in its entirety.

TECHNICAL FIELD

The technical field relates to a component for installation in an exhaust system of a motor vehicle, such as a pipe piece, a filter housing, or the like, having a first and second exhaust passage for the entry of the exhaust gas into the component or the exit therefrom.

BACKGROUND

In an engine compartment of a motor vehicle or its immediate surroundings, the installation of exhaust system components can be made more difficult by the high density of other parts, which limit the available free space for the exhaust ring component at the intended installation location or make the path of the exhaust system component to its intended installation location difficult to pass. Tilting of the exhaust system component in an incompletely fastened state can result in damage of an attachment flange of the exhaust system component or an adjacent component to which the attachment flange is to be fastened.

In an exhaust catalytic converter that is currently installed by the applicant in motor vehicles, an exhaust passage is enclosed by an attachment flange, which has multiple holes parallel to an axis of the flange. These holes are provided to receive bolts protruding from a complementary flange of an adjacent component. When the attachment flange of the exhaust catalytic converter is pushed onto the bolts, its mobility is restricted to a single degree of freedom of translation in the direction of the axis of the attachment flange, even if it is otherwise not yet fastened to the adjacent component. Tilting, which could result in damage to the flange, is prevented and the catalytic converter can be installed comparably and securely, in that nuts are screwed onto the bolts.

To be able to install this typical catalytic converter, there must be sufficient movement freedom in the direction of the mentioned axis to be able to place a catalytic converter on the complementary flange. This movement freedom is not always provided. In an installation situation that does not permit the catalytic converter to be pushed onto bolts installed on the complementary flange, the possibility may exist of first bringing the attachment flange of the catalytic converter into contact with the complementary flange of the adjacent component, and only subsequently guiding the bolts through holes of both flanges. This approach does only need a small amount of movement freedom of the exhaust catalytic converter in the direction of the flange axis, but has the disadvantage that as long as the bolts are not in place, movements of the catalytic converter that could result in damage to the flange remain possible. In addition, it presumes that the rear side of the complementary flange, which faces away from the exhaust system component to be installed, is accessible in order to be able to insert the bolts into the holes therefrom or fasten nuts thereon. This accessibility is not always provided.

At least one object is therefore to provide an exhaust system component for a motor vehicle, which allows installation of the exhaust system component on preinstalled fastening bolts of an adjacent component even if the movement freedom of the exhaust system component is strongly restricted in the longitudinal direction of the fastening bolts during the installation. In addition, other objects, desirable features, and characteristics will become apparent from the subsequent summary and detailed description, and the appended claims, taken in conjunction with the accompanying drawings and this background.

SUMMARY

An exhaust system component is provided that has a first exhaust passage, an attachment flange, which encloses the first exhaust passage, for connecting the component to an adjacent component, the attachment flange defining an attachment plane for the contact with the adjacent component and having fastening holes for the connection to the adjacent component, and a second exhaust passage which is spaced apart from the first exhaust passage in a longitudinal direction of the component, a normal line to the attachment plane extending at a non-negligible angle to the longitudinal direction, the fastening holes are elongated in a direction parallel to the attachment plane. Through the elongated shape of the fastening holes, a residual movement freedom of the exhaust system component remains in a second degree of freedom. This residual movement freedom remains even after it has been pushed onto the fastening bolts of the adjacent component, and the exhaust system component can reach its final installation position by a movement in this degree of freedom, which is parallel to the attachment plane.

If the fastening holes extend around a common center point, the degree of freedom parallel to the attachment plane can be a rotational degree of freedom. This common center point is preferably also the center point of the first exhaust passage; other embodiments, e.g., one in which the common center point is a fastening hole penetrated by a fastening pin of the complementary flange, also come into consideration.

The exhaust system component preferably has a housing between the exhaust passages, whose dimensions in the transverse direction are greater than the width of the exhaust passages. Such a housing can accommodate a catalytic converter or filter material, for example.

Furthermore, a method for installing an exhaust system component of the above-described art is an object of the invention, having the following steps: a) providing an attachment flange on an adjacent component, which is complementary to the attachment flange of the exhaust system component; b) bringing the attachment flanges into contact, fastening bolts of the complementary attachment flange penetrating the fastening holes of the attachment flange of the exhaust system component; c) rotating the exhaust system component around the normal line up to a target orientation; and d) fastening the flanges on one another.

By the rotation, the exhaust system component can engage in a niche, in particular between other installed parts of an engine compartment of a motor vehicle, in which a movement of the exhaust system component held in the target orientation in the direction of the normal line, which is sufficient to permit the fastening bolts to disengage from the fastening holes, is not possible.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background of the invention or the following detailed description.

Figure 1:
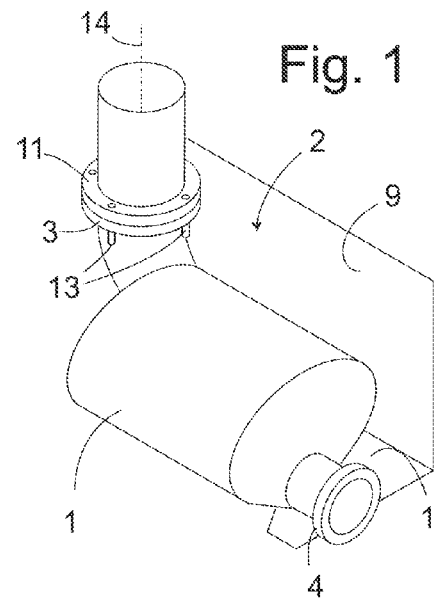
FIG. 1 shows a schematic view of an exhaust system component and its surroundings in a target orientation.
Figure 2:
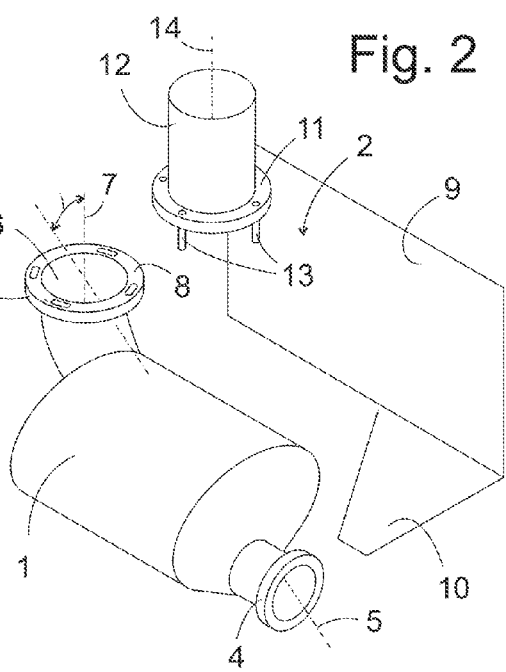
FIG. 2 shows the niche and the exhaust system component offset from the niche.

FIG. 1 and FIG. 2 are schematic perspective views of an exhaust catalytic converter 1 and a niche 2 in an engine compartment of a motor vehicle, which is provided to receive the catalytic converter 1. The catalytic converter 1 has a metallic housing in a way known per se, in which a porous substrate is housed, through which exhaust gas to be purified flows. Inlet and outlet flanges 3, 4 are located at opposite ends of the housing, so that the points of the catalytic converter 1 farthest apart from one another are located on the two flanges and the direction of a straight line 5 connecting them can be considered to be a longitudinal direction of the housing. The inlet flange 3 encloses a circular inlet opening 6. An axis 7 of the inlet passage 3 is perpendicular to its front face 8 and run centrally through the inlet opening 6. The axis 7 extends at a non-negligible angle α to the longitudinal direction. Multiple fastening holes 15 extend parallel to the axis 7 through the flange 3.

In this example, the niche 2 is open horizontally in one direction, toward the observer in FIG. 1 and FIG. 2, and is delimited by an engine block in the opposite direction, for example. In the vertical direction, the niche 2 is delimited on both sides, e.g., on the bottom by a part of a frame 10 supporting the engine block 9 and on top by an attachment flange 11 of an exhaust gas supply line 12, which is connected to an exhaust gas manifold or turbocharger of the engine, for example. Multiple fastening bolts 13 are preinstalled protruding downward on the attachment flange 11 complementary to the inlet flange 3.

The installation space available for the exhaust catalytic converter 1 in the vertical direction is not sufficient to allow a parallel displacement of the catalytic converter from its position shown in FIG. 2 into the installed position on the attachment flange 5 shown in FIG. 1 if one wishes to place the inlet flange 3 below the attachment flange 11 so that the axes 7, 14 of both flanges 3, 11 are congruent and the fastening holes 15 of the inlet flange 3 can be pushed onto the bolts 13 of the flange 5 in a movement parallel to the axes 7, 14, a part of the housing of the catalytic converter 1 would collide with the frame 10.

Figure 3:
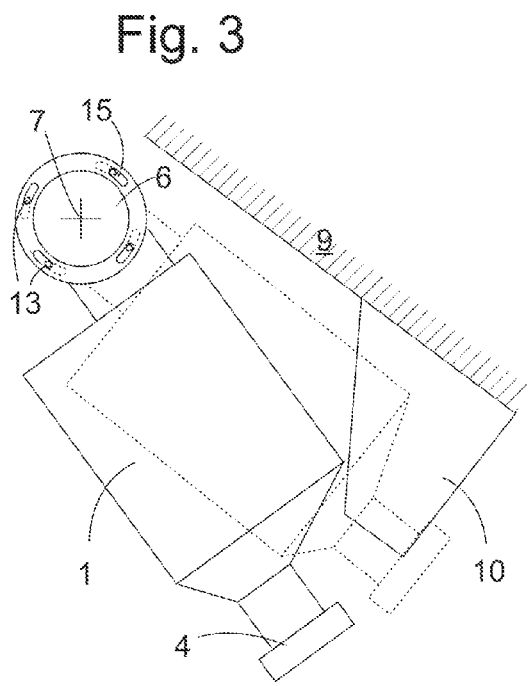
FIG. 3 shows a top view of the exhaust system component in the installation orientation or in the target orientation.

As is clear in FIG. 3, it is possible thanks to the elongated shape of the fastening holes 15 to place the catalytic converter 1 on the attachment flange 11 in an orientation which is pivoted to the orientation of FIG. 2 and is shown by solid lines in FIG. 3 in such a manner that the axes 7, 14 are on one line and then to raise the exhaust catalytic converter 1 so that the bolts 13 engage in the fastening holes 15. After the flanges 3, 4 have been brought into contact with one another in this manner, the catalytic converter 1 can be pivoted around the axis 9 into the target orientation shown by dashed lines in FIG. 3, in which it is located partially above the frame.

Figure 4:
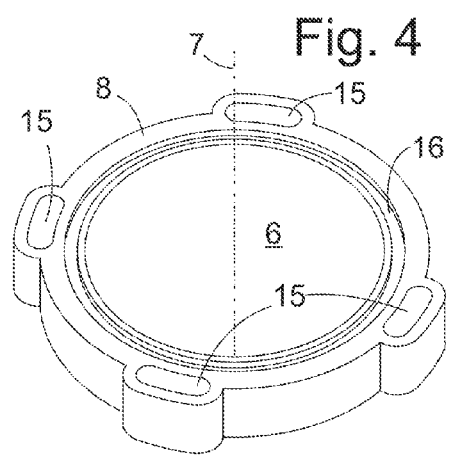
FIG. 4 shows a perspective view of the attachment flange of the exhaust system component.

FIG. 4 is an enlarged perspective view of the inlet flange 3. It extends in a ring shape around the inlet opening 6 and has a flat front face 8 facing toward the attachment flange 11, which is perpendicular to the axis 7 and is provided to come into contact with the attachment flange 11. A ring groove 16 can be worked into the front face 8, in order to receive a sealing ring (not shown) or a ring-shaped rib of the attachment flange 11, which fixes the axis 14 of the attachment flange 11, around which the catalytic converter 1 pivots into the target orientation. The fastening holes 15 extend in a ring around the ring groove 16, each in the form of circular arcs concentric to the axis 7 of the flange 3.

In the case of FIG. 4, all fastening holes 15 are on an identical circle around the axis 7. However, an embodiment is also conceivable, in which the circular arcs of the fastening holes 15 have different radii in relation to a common center point. In the extreme case, the radius for one of the fastening holes can be zero; i.e., this hole is not elongated, but rather marks the common center point of the remaining holes and therefore the axis around which the exhaust catalytic converter is pivotable.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An exhaust system component for a motor vehicle, comprising:
    a first exhaust passage;
    an attachment flange that is configured to enclose the first exhaust passage and configured to connect the exhaust system component to an adjacent component;
    an attachment plane defined by the attachment flange for contact with the adjacent component and having fastening holes for connection to the adjacent component;
    a second exhaust passage that is spaced apart from the first exhaust passage in a longitudinal direction of the exhaust system component;
    a normal line to the attachment plane extending at a non-negligible angle to the longitudinal direction; and
    a plurality of fastening holes that are elongated in a direction parallel to the attachment plane;
    wherein each fastening hole is configured as a circular arc concentric to a central axis of the attachment flange.

2. The exhaust system component according to claim 1, wherein the plurality of fastening holes extend around a common center point.

3. The exhaust system component according to claim 2, wherein the common center point is also a center point of the first exhaust passage.

4. The exhaust system component according to claim 1, further comprising a housing between the first exhaust passage and the second exhaust passage,
    wherein a dimension in a transverse direction is greater than a width of the first exhaust passage and the second exhaust passage.

5. The exhaust system component according to claim 1, wherein the exhaust system component is an exhaust catalytic converter.

\* \* \* \* \*